United States Patent [19]

Niihara et al.

[11] Patent Number: 5,134,097
[45] Date of Patent: Jul. 28, 1992

[54] SILICON NITRIDE-SILICON CARBIDE COMPOSITE MATERIAL AND PROCESS FOR PRODUCTION THEREOF

[75] Inventors: Koichi Niihara, Yokosuka; Kansei Izaki; Takamasa Kawakami, both of Niigata, all of Japan

[73] Assignee: Mitsubishi Gas Chemical Co., Inc., Japan

[21] Appl. No.: 787,129

[22] Filed: Nov. 4, 1991

Related U.S. Application Data

[63] Continuation of Ser. No. 527,845, May 24, 1990, abandoned.

[30] Foreign Application Priority Data

Jun. 1, 1989 [JP]  Japan ........................... 1-137486

[51] Int. Cl.$^5$ ............................. C04B 35/56
[52] U.S. Cl. ............................. 501/92; 501/88; 501/95
[58] Field of Search ............... 501/92, 88, 95, 97, 501/98

[56] References Cited

U.S. PATENT DOCUMENTS

| | | | |
|---|---|---|---|
| 4,184,882 | 1/1980 | Lange | 501/92 |
| 4,187,116 | 2/1980 | Lange | 501/92 |
| 4,594,330 | 6/1986 | Suzuki et al. | 501/92 |
| 4,613,490 | 9/1986 | Suzuki et al. | 423/344 |
| 4,800,182 | 1/1989 | Izaki et al. | 501/92 |
| 4,882,304 | 11/1989 | Novich et al. | 501/95 |
| 4,885,269 | 12/1989 | Hillig et al. | 501/95 |
| 4,888,310 | 12/1989 | Richon et al. | 501/92 |
| 4,919,868 | 4/1990 | Huang | 501/97 |
| 4,923,829 | 5/1990 | Yasutomi et al. | 501/95 |

FOREIGN PATENT DOCUMENTS 61117108  6/1986  Japan .

Primary Examiner—William R. Dixon, Jr.
Assistant Examiner—S. E. Hollenback
Attorney, Agent, or Firm—Leydig, Voit & Mayer

[57] ABSTRACT

A sintered silicon nitride-silicon carbide composite material is provided comprising a matrix phase of silicon nitride and silicon carbide where silicon carbide grains having an average diameter of not more than 1 $\mu$m are present at grain boundaries of silicon nitride grains and silicon carbide grains having a diameter of several nanometers to several hundred nanometers, typically not more than about 0.5 micrometers, are dispersed within the silicon nitride grains and a dispersion phase where (a) silicon carbide grains having an average diameter of 2 to 50 $\mu$m and/or (b) silicon carbide whiskers having a short axis of 0.05 to 10 $\mu$m and an aspect ratio of 5 to 300 are dispersed in the matrix phase. A process for the production of the composite material is also provided.

9 Claims, No Drawings

SILICON NITRIDE-SILICON CARBIDE COMPOSITE MATERIAL AND PROCESS FOR PRODUCTION THEREOF

This application is a continuation application of Ser. No. 07/527,845, filed May 24, 1990, abandoned.

BACKGROUND OF THE INVENTION

This invention relates to a sintered silicon nitride-silicon carbide composite material having a specific fine structure and a process for the production thereof. More specifically, it relates to a sintered silicon nitride-silicon carbide composite material having a composite structure consisting of a matrix phase and dispersion phase; the matrix phase has a silicon nitride-silicon carbide fine structure where silicon carbide grains having an average diameter of not more than 1 μm are present at grain boundaries of silicon nitride grains and silicon carbide grains having a diameter of several nanometers to several hundred nanometers are dispersed within the silicon nitride grains, and the dispersion phase has a structure where (a) silicon carbide grains having an average diameter of 2 to 50 μm and/or (b) silicon carbide whiskers having a short axis of 0.05 to 10 μm and an aspect ratio of 5 to 300 are dispersed.

The present sintered silicon nitride-silicon carbide composite material has excellent fracture toughness, and also has excellent room-temperature and high-temperature strength. It is therefore useful as a high-temperature structural material, sliding material or wear-resistant material for a gas turbine, engine, and the like.

Silicon nitride and silicon carbide have recently been attracting special attention as an engineering ceramic for a high-temperature structural material. In particular, silicon nitride has excellent properties of outstanding heat and impact resistance and fracture toughness, and silicon carbide has excellent properties of outstanding oxidation resistance and high-temperature strength. For this reason, silicon nitride and silicon carbide are now under development utilizing these properties. Further, many attempts are also under way to develop silicon nitride-silicon carbide composite materials in order to utilize advantages of these two materials.

Silicon nitride-silicon carbide composite materials have been conventionally produced, e.g. by the following methods.

(1) A method of mixing a silicon nitride ($Si_3N_4$) powder and a silicon carbide (SiC) powder or whiskers mechanically and sintering the mixture under pressureless or sintering it under pressure such as hot pressing, HIP, or the like.

(2) A method of using reaction sintering, in which silicon nitride ($Si_3N_4$) is formed by a nitriding reaction of a shaped article formed of a silicon carbide (SiC) powder and a silicon (Si) powder, or in which silicon carbide (SiC) is formed by permeating silicon (Si) into a shaped article formed of a silicon nitride ($Si_3N_4$) powder and carbon.

(3) A method of forming a silicon nitride-silicon carbide composite material by heating a mixture of an organo-silicon polymer or organo-silicon compound with a silicon (Si) powder.

Of these methods, the methods (2) and (3) advantageously exhibit good dimensional accuracy and excellent moldability. However, sintered bodies obtained in these two methods are liable to be porous, and it is difficult to produce a dense sintered composite material. Hence, the sintered bodies often have poor physical properties as compared to silicon nitride and silicon carbide. For example, the sintered bodies produced in these methods have lower strength than silicon nitride and silicon carbide.

In general, therefore, the above method (1) is usually employed to produce a dense sintered composite material. This method is generally classified into two groups; one is to add silicon carbide whiskers to silicon nitride, and the other is to add a silicon carbide powder to silicon nitride. Silicon nitride-silicon carbide composite materials in which whiskers are dispersed are described, e.g. in a YOGYO KYOKAI-SHI 91, 491 (1983) and 94, 981 (1986). That is, these authors describe that silicon nitride-silicon carbide composite materials which have high fracture toughness and low reduction in strength at high temperature and which have a large Weibull modulus for reliability can be obtained by mixing a silicon nitride powder with silicon carbide whiskers and sintering the mixture by hot-pressing.

On the other hand, examples of the silicon nitride-silicon carbide composite material using a silicon carbide powder are described, e.g. in U.S. Pat. No. 4,184,882, or J. Am. Ceram. Soc., 56,445 (1973). That is, these publications disclose that the addition of a silicon carbide (SiC) powder having a diameter of 5 to 32 μm (40% by volume at maximum) to a silicon nitride ($Si_3N_4$) powder can give a sintered composite material having improved thermal conductivity and high-temperature strength as compared with silicon nitride.

As described above, sintered composite materials produced by these conventional methods have partly-improved physical properties. However, these composite materials are not satisfactory for mechanical properties which have been recently required of heat-resistant materials for a gas turbine, etc. In view of the problem of this kind, the present inventors have already proposed in Japanese Patent Kokai (Laid-Open) No. 159256/1988 (corresponding to U.S. Pat. No. 4,800,182) that a silicon nitride-silicon carbide composite material, which is excellent in both room-temperature strength and fracture toughness over silicon nitride, can be obtained by homogeniously dispersing silicon carbide having an average diameter of not more than 1 μm in silicon nitride to convert the silicon nitride to an elongated grains. Further, the present inventors have disclosed in Japanese Patent Application No. 31125/1989 that a sintered silicon nitride-silicon carbide composite material having a specific fine structure where silicon carbide is dispersed not only at grain boundaries of the silicon nitride but also within the individual silicon nitride grains is excellent in room-temperature/high-temperature strength, fracture toughness and heat insulation, and also has high hardness and excellent wear resistance. However, in order to make wide use of silicon nitride and silicon carbide which are brittle materials, it is still required to further improve their fracture toughness in particular.

It is an object of this invention to provide a sintered silicon nitride-silicon carbide composite material having excellent fracture toughness and excellent room-temperature and high-temperature strength over conventional silicon nitride-silicon carbide composite materials, and a process for the production thereof.

SUMMARY OF THE INVENTION

According to this invention, there is provided a sintered silicon nitride-silicon carbide composite material comprising (1) a matrix phase of silicon nitride and silicon carbide where silicon carbide grains having an average diameter of not more than 1 μm are present at grain boundaries of silicon nitride grains and silicon carbide grains having a diameter of several nanometers to several hundred nanometers typically not more than about 0.5 micrometers are dispersed within the silicon nitride grains and (2) a dispersion phase where (a) silicon carbide grains having an average diameter of 2 to 50 μm and/or (b) silicon carbide whiskers having a short axis of 0.05 to 10 μm and an aspect ratio of 5 to 300 are dispersed in the matrix phase.

Further, according to this invention there is provided a process for the production of a sintered silicon nitride-silicon carbide composite material, which comprises:

(a) mixing a matrix phase-forming material of an amorphous silicon nitride-silicon carbide hybrid power to form fine silicon carbide having an average grain diameter of not more than 0.5 μm, or of a powdery mixture of a silicon carbide powder having an average particle diameter of not more than 0.5 μm with a silicon nitride powder, with a dispersion phase-forming material of silicon carbide powder having an average grain diameter of 2 to 50 μm and/or of silicon carbide whiskers having a short axis of 0.05 to 10 μm and an aspect ratio of 5 to 300 and a sintering additive, (b) forming a shaped article of the mixture, and (c) sintering the shaped article at a temperature between 1,500° C. and 2,300° C.

The sintered silicon nitride-silicon carbide composite material having such a fine structure, provided by this invention, has high fracture toughness which conventional silicon nitride-silicon carbide composite materials have never had, and the present composite materials also has excellent room-temperature and high-temperature strength.

DETAILED DESCRIPTION OF THE INVENTION

It is because of specificity of the fine structure of the present sintered silicon nitride-silicon carbide composite material that the present composite material has high fracture toughness which conventional composite materials have never had, and also has excellent room-temperature and high-temperature strength.

The present sintered silicon nitride-silicon carbide composite material is composed of a matrix phase and a dispersion phase. The matrix phase is formed of a silicon nitride-silicon carbide composite material having a structure where fine silicon carbide grains having a diameter of not more than 1 μm are present at grain boundaries of the silicon nitride grains and a fine silicon carbide grains having a size of the order of nanometers are dispersed within the silicon nitride grains. And, a major part of the matrix phase-forming grains are formed of small grains having a size on the order of submicron or several micron level.

On the other hand, grains of the dispersion phase are large as compared with the matrix phase-forming grains, and has a structure where the grains of the dispersion phase are homogeniously dispersed in the matrix phase.

The silicon carbide amount in the matrix phase of the present composite material is 3 to 25% by volume, preferably 5 to 20% by volume. When the silicon carbide amount is less than the lower limit, there is not any sufficient contribution to improvement in fracture toughness and strength. When this amount exceeds the upper limit, the resultant composite material has low fracture toughness, or it is difficult to obtain a dense sintered composite material.

That is, when the silicon carbide amount in the matrix phase of the present composite material is small, the silicon nitride forms a structure consisting of many elongated grains and equiaxed grains where the elongated grains have a high aspect ratio. A major part of the silicon carbide forms grains having a size of several nanometers to several hundred nanometers typically not more than about 0.5 micrometers and are present within the silicon nitride grains, and a part of the silicon carbide forms grains having a diameter on the order of submicron levels and is present at the grain boundaries of the silicon nitride grains. Since the elongated silicon carbide grains are well developed, a crack in the matrix phase runs deviatedly, or pinned by dispersed silicon carbide or microcracks occur due to a thermal expansion difference between silicon nitride and silicon carbide and the energy of the crack propagation is dispersed. These are presumably reasons for improvement in fracture toughness of the matrix phase portion over silicon nitride, and it is also assumed that these contribute to the room-temperature and high-temperature strength and improve the strength over silicon nitride.

On the other hand, when the silicon carbide amount in the matrix phase is large, the development of silicon nitride grains is prevented, a major art of the silicon nitride forms small-diametered equiaxed grains, and the silicon carbide is present not only within the silicon nitride but also at their grain boundaries. Thus, a crack runs less difficultly than it does when the silicon carbide amount is small. Since, however, the matrix-forming grains, in this case have a smaller diameter, a defect in the resultant sintered composite material is smaller. It is assumed that the strength is therefore improved over silicon nitride. The silicon carbide grains present at the grain boundaries prevent the sliding among the silicon nitride grains, and further, a high residual stress is generated by the silicon carbide grains present at the grain boundaries and within the silicon nitride grains. These are presumably factors for improvement in the high-temperature strength over silicon nitride.

On the other hand, as described previously, the grains of the dispersion phase in the present sintered composite material are larger than the matrix phase-forming grains and form a structure where they are dispersed in the matrix phase. For this reason, a crack is pinned at the dispersion phase or runs deviatedly, a whisker is pulled out when the dispersion phase is formed of whiskers, or the dispersion phase itself is destructed. It is assumed that these consume the crack propagation energy and consequently contribute to improvement in fracture toughness.

It is considered that since the matrix phase and the dispersion phase contribute respectively to improvement in the fracture toughness, the present silicon nitride-silicon carbide composite material has unconventionally high fracture toughness and excellent room-temperature and high-temperature strength.

The sintered composite material of this invention is produced from raw materials such as a material to form the matrix phase, a material to form the dispersion phase, sintering additives and, optionally, a binder necessary for shaping.

In this invention, the silicon carbide to used as a raw material to form the powdered matrix phase has to be present, in a sintering process, as grains having an average diameter of not more than 0.5 μm. That is, for the silicon carbide in the matrix phase, this invention uses a powder having an average particle diameter of not more than 0.5 μm when a silicon carbide powder is used as a raw material or uses an amorphous powder which can form, at sintering time, a silicon carbide powder having a diameter of not more than 0.5 μm. A gas phase reaction method using heat or plasma is suitable to obtain such a silicon carbide fine powder.

The silicon nitride of the matrix phase in the present invention may be a conventional crystalline or amorphous powder. In view of dispersibility of the dispersion phase, it is desirable to use a powder having an average particle diameter of not more than 2 μm.

The suitable raw material powder to form the matrix phase of the present invention is an amorphous powder composed of silicon, carbon, nitrogen and oxygen. An example of such a powder is an amorphous powder composed of silicon, carbon, nitrogen and oxygen, which can be produced by a process described in Japanese Patent Kokai (Laid-Open) Nos. 200812/1985, 200813/1985, 221311/1985, 235707/1985 and 117108/1986 (the first four publications correspond to U.S. Pat. No. 4,594,330). This powder can form, as a raw material, a homogeneous mixture of silicon carbide with silicon nitride, and makes it possible to disperse silicon carbide homogeniously in the matrix phase.

Specifically, an amorphous fine powder is obtained by gasifying an organic silicon compound, fully mixing the resultant gas with a non-oxidizing gas containing ammonia, and then introducing the mixture gas into a reactor heated to a predetermined temperature for reaction.

Examples of the organic silicon compound used to synthesize the above amorphous composite powder composed of silicon, carbon, nitrogen and oxygen are silazane compounds such as [(CH$_3$)$_3$Si]$_2$NH, [(CH$_3$)$_2$SiNH]$_3$, [HSi(CH$_3$)$_2$)$_3$]$_2$NH, [(CH$_3$)$_3$Si]$_3$NCH$_3$ and [CH$_3$)$_2$Si-NCH$_3$], six-membered tris(N-methylamino)tri-N-methyl-cyclotrisilazane represented by the following formula and having an N-methylamino group as a substituent on each of its silicon atoms,

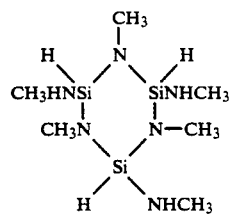

aminosilicon compounds such as CH$_3$Si(NHCH$_3$)$_3$, (CH$_3$)$_2$Si(NHCH$_3$)$_2$ and (CH$_3$)$_2$Si[N(CH$_3$)$_2$], cyanosilicon compounds such as (CH$_3$)$_3$SiCN, (CH$_3$)$_2$Si(CN)$_2$, (C$_6$H$_5$)$_3$SiCN, (C$_6$H$_5$)$_2$Si(CN)$_2$, H$_3$SiCN and (CH=CH)CH$_3$Si(CN)$_2$, and organic silicon compounds such as (CH$_3$)$_4$Si,

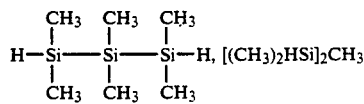

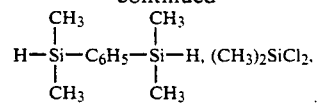

(CH$_3$)SiCl and (CH$_3$)$_3$SiCl.

On the other hand, as a raw material to form the dispersion phase, (a) silicon carbide powder having an average particle diameter of 2 to 50 μm and/or (b) silicon carbide whiskers having a short axis of 0.05 to 10 μm and an aspect ratio of 5 to 300 can be used. These materials are conventionally commercially available. The amount of the dispersion phase depends on the silicon carbide amount in the matrix phase. In general, however, it is 5 to 40% by volume, preferably 10 to 30% by volume. When the amount of the dispersion phase is less than 5% by volume, there is only a small contribution to improvement in fracture toughness value. When this amount is more than 40% by volume, it is, undesirably, difficult to obtain a dense sintered composite material.

Further, as the sintering additives, all of those which are conventionally used for silicon nitride and silicon carbide and form a liquid phase at a sintering process can be used. Examples of such a sintering additives include MgO, Al$_2$O$_3$, Y$_2$O$_3$, AlN, SiO$_2$ and oxides of lanthanum series. These can be used alone or in combination. The amount of the sintering additives is usually 0.1 to 30% by weight.

These powders are fully mixed according to a conventional method, and the mixing method may be dry or wet.

A shaped article is formed by casting, molding, extrusion or injection molding. A binder, lubricant or solvent suitable for such a shaping method is incorporated before the shaping.

The sintering method for this invention may be a conventional, pressureless sintering, hot-pressing, gas pressure sintering or HIP method.

In a sintering process it is required to form a liquid phase fully. For example, the shaped article is held at or above a temperature used form a liquid phase such that the liquid phase can fully permeate into interparticle spaces before the sintering step is initiated, whereby the resultant sintered article has the fine structure of this invention uniformly formed. And, the amount of interparticle and interparticle silicon carbide in the matrix phase can be controlled by the above holding procedure.

The suitable sintering temperature is 1,500° to 2,300° C., and the sintering is usually carried out at a temperature between 1,600° C. and 1,850° C., between which silicon nitride is not decomposed. For example, in the typical hot-pressing method, the sintering is carried out at a temperature between 1,650° C. and 1,850° C. under a pressure of 200 to 400 kg/cm$^2$ for 0.5 to 5 hours. As a result of such a sintering, the matrix phase of the final composite material is mainly composed of β-phase silicon nitride and β-phase silicon carbide.

When the sintering is carried out by an HIP or gas pressure sintering method, the silicon nitride decomposition temperature can be increased, and the sintering temperature can be therefore increased. In such a sintering method, silicon carbide in the silicon nitride-silicon carbide composite material can be changed to a phase rich with an α phase.

The sintering additives can react with silicon nitride or silicon carbide to form a crystalline phase in a cooling step depending upon sintering temperature conditions, which formation reinforces the grain boundary phase and particularly has a favorable effect on high-temperature strength.

DESCRIPTION OF THE PREFERRED EMBODIMENTS

This invention will be further described hereinbelow by reference to Examples and Comparative Examples. Examples show some embodiments of this invention, and shall not limit this invention.

In addition, the room-temperature strength was tested as follows. Test pieces having a size of $3 \times 4 \times >36$ mm were used, and a three-point bending test was carried out at a span of 30 mm and a crosshead speed of 0.5 mm/min. Further, for the high-temperature strength, test pieces having a size of $2 \times 3 \times >24$ mm were used, and a three-point bending test was carried out at a span of 20 mm and a cross speed of 0.5 mm/min. Composite material samples were measured for a bulk density according to an Archimedean method, and for a hardness according to Vickers hardness measurement using a microvickers hardness tester (load 19.6N, holding time 20 seconds). Further, the fracture toughness was measured by using an indentation microfacture method and evaluating a length of a crack which occurred at an hardness measuring time on the basis of the equation described in J. Mater. Sci. Lett. 1,13 (1982).

EXAMPLES 1-8 AND COMPARATIVE EXAMPLES 1-2

A vertical electrical resistance heater oven equipped with an aluminum reaction tube having a diameter of 90 mm and a length of 1,300 mm was adjusted to and maintained at 1,050° C. Separately, a reaction raw material, hexamethyldisilazane [(CH$_3$)$_3$Si]$_2$NH, was introduced into an evaporator at a rate of about 500 g/hr to gasify it completely, and mixed fully with an NH$_3$/Ar mixture gas having a predetermined mixing ratio. The resultant mixture gas was introduced into the above reactor for reaction. About 200 g of the resultant formed powder was charged into an alumina container, and heat-treated under an N$_2$ current at 1,350° C. for 4 hours to obtain a raw material powder composed of silicon, nitrogen, carbon and oxygen for matrix phases having various carbon amounts. X-ray diffraction of the raw material powder showed that it was amorphous, and the observation thereof by SEM photography showed that it was of spherical particles having a diameter of not more than 0.5 μm A silicon carbide powder having an average particle diameter shown in Table 1 and/or silicon carbide whiskers (β-type, diameter 0.1 to 1.0 μm, aspect ratio 50 to 300) for a dispersion phase were added to the above raw material powder for a matrix phase in a mixing ratio shown in Table 1. Further, 6% by weight of Y$_2$O$_3$ and 2% by weight of Al$_2$O$_3$ were added as a sintering additive to form a liquid phase, and these components were wet-mixed in ethanol. The resultant powdery mixture was dried, then charged into a graphite die having a diameter of 50 mm, and hot-pressed in a nitrogen gas under a pressure of 350 kg/cm$^2$ at 1,800° C. for 2 hours. The resultant sintered body was cut, polished with a diamond grinder, and then cut into test pieces having a size of $3 \times 4 \times >36$ mm. Then, a three-point bending test was carried out on the test pieces. The test pieces were also polished with 3 μm or 1 μm diamond paste, and measured for a hardness and a fracture toughness value. Table 1 shows the results. In Table 1, the silicon carbide amounts were calculated on the assumption that all of carbon atoms in the raw material were converted to SiC.

TABLE 1

| | Example 1 | 2 | 3 | 4 | 5 | 6 | 7 | 8 | Comparative Example 1 | Comparative Example 2 |
|---|---|---|---|---|---|---|---|---|---|---|
| SiC amount in matrix phase (Vol %) | | | | 10 | | | 17 | | 10 | 32 |
| Dispersion phase | | | | | | | | | | |
| SiC powder (μm) Average particle diameter | 10 | 18 | 39 | | | 18 | 18 | | 60 | |
| Amount (Vol %) | 20 | 30 | 20 | | | 10 | 15 | | 20 | |
| SiC whisker Amount (Vol %) | | | | 20 | 30 | 20 | | 15 | | |
| Properties of sintered body | | | | | | | | | | |
| Density (g/c) | 3.26 | 3.25 | 3.27 | 3.23 | 3.20 | 3.21 | 3.23 | 3.19 | 3.20 | 3.27 |
| Hardness (GPa) | 17.2 | 17.9 | 17.3 | 17.0 | 18.3 | 18.0 | 18.5 | 18.3 | 16.8 | 18.2 |
| Strength (kg/mm$^2$) | | | | | | | | | | |
| Room-temperature | 127 | 120 | 108 | 113 | 102 | 105 | 139 | 125 | 85 | 125 |
| 1,200° C. | 96 | 104 | 92 | 96 | 90 | 93 | 90 | 108 | — | 113 |
| Fracture toughness (MN/m$^{3/2}$) | 7.6 | 8.4 | 7.4 | 7.9 | 8.2 | 8.2 | 7.3 | 8.0 | 6.6 | 5.7 |

Note: The matrix phase was formed of Si$_3$N$_4$—SiC.

EXAMPLES 9-12

An amorphous Si$_3$N$_4$ powder (average particle diameter 0.3 μm, impurities Fe, Al and Ca respectively <50 ppm, C=0.9% by weight) obtained in the same way as in Examples 1 to 8 was converted to a β-SiC powder in ratios shown in Table 2, and used for a matrix phase. The same silicon carbide powder or whiskers as those used in Examples 1 to 8 were added for a dispersion phase, and further, sintering auxiliaries, 6% by weight of Y$_2$O$_3$ and 2% by weight of Al$_2$O$_3$, were added. These components were wet-mixed together in ethanol with Si$_3$N$_4$ balls for 5 hours, and hot-pressed under the same conditions as those in Examples 1 to 8. Table 2 shows the results.

TABLE 2

| | Example 9 | 10 | 11 | 12 |
|---|---|---|---|---|
| SiC amount in matrix phase (Vol %) | 10 | | 20 | |
| Dispersion phase | | | | |
| SiC powder (μm) Average particle diameter | 18 | | 18 | |
| Amount (Vol %) | 20 | | 15 | |
| SiC whisker Amount (Vol %) | | 20 | | 15 |
| Properties of sintered body | | | | |
| Density (g/c) | 3.25 | 3.21 | 3.19 | 3.16 |
| Hardness (GPa) | 17.6 | 17.3 | 17.3 | 17.5 |
| Strength (kg/mm$^2$) | | | | |
| Room-temperature | 106 | 111 | 121 | 107 |
| 1,200 °C. | 92 | 98 | 87 | 95 |
| Fracture toughness (MN/m$^{3/2}$) | 7.6 | 7.7 | 7.4 | 7.6 |

Note: The matrix phase was formed of Si$_3$N$_4$—SiC.

COMPARATIVE EXAMPLE 3

Six percent by weight of Y$_2$O$_3$ and 2% by weight of Al$_2$O$_3$ were added to a commercially available high-purity crystalline Si$_3$N$_4$ powder (α-phase 90%, average particle diameter 0.6 μm, impurities Fe, Al and Ca respectively <50 ppm, 0<1% by weight), and these components were wet-mixed together in ethanol with Si$_3$N$_4$ balls for 5 hours, and then, hot-pressed under the same conditions as those in Examples 1 to 8. Physical properties of the sintered composite material were measured to show a density of 3.26 g/cm$^3$, a Vickers hardness of 14.5 GPa, a three-point bending strength, at room temperature, of 87 kg/mm$^2$, a three-point bending strength, at 1,200° C., of 60 kg/mm$^2$ and a fracture toughness of 5.2 MN/m$^{3/2}$.

COMPARATIVE EXAMPLES 4–5

The same silicon carbide powder or whiskers as those used in Examples 1 to 8 were added to the same Si$_3$N$_4$ powder as that used in Comparative Example 3, and further, 6% by weight of Y$_2$O$_3$ and 2% by weight of Al$_2$O$_3$, were added. The resultant mixture was hot-pressed under the same conditions as those in Examples 1 to 8. Table 3 shows physical properties of the sintered composite materials.

TABLE 3

| | Comparative Example 4 | Comparative Example 5 | Comparative Example 6 |
|---|---|---|---|
| SiC amount in matrix phase (Vol %) | | Si$_3$N$_4$ powder | |
| Dispersion phase | | | |
| SiC powder (μm) Average particle diameter | 18 | 39 | |
| Amount (Vol %) | 30 | 30 | |
| SiC whisker Amount (Vol %) | | | 30 |
| Properties of sintered body | | | |
| Density (g/c) | 3.21 | 3.08 | 3.05 |
| Hardness (GPa) | 17.2 | 17.0 | 16.9 |
| Strength (kg/mm$^2$) | | | |
| Room-temperature | 82 | 76 | 80 |
| 1,200° C. | 56 | 49 | 46 |
| Fracture toughness (MN/m$^{3/2}$) | 5.6 | 5.4 | 6.0 |

The sintered composite material produced according to the above process of this invention has a specific fine structure which conventional silicon nitride-silicon carbide composite materials have never had. Therefore, the composite material of this invention has unconventionally high fracture toughness and excellent room-temperature and high-temperature strength, and can be used as a high-temperature structure material and sliding material and wear-resistant material for a gas turbine, engine, etc.

What is claimed is:

1. A sintered silicon nitride-silicon carbide composite material comprising (1) a matrix phase of silicon nitride and silicon carbide where silicon carbide grains having an average diameter of not more than 1 μm are present at grain boundaries of silicon nitride and silicon carbide grains having a diameter of not more than about 0.5 micrometers are dispersed within the silicon nitride grains; and dispersed in the matrix phase (2) a dispersion phase including (a) silicon carbide grains having an average diameter of 2 to 50 μm and (b) silicon carbide whiskers having a short axis of 0.05 to 10 μm and an aspect ratio of 5 to 300.

2. A sintered composite material according to claim 1, which comprises 5 to 40% by volume of the dispersion phase.

3. A sintered composite material according to claim 1, wherein the matrix phase contains 3 to 25% by volume of the silicon carbide particles.

4. A sintered silicon nitride-silicon carbide composite material comprising (1) a matrix phase of silicon nitride and silicon carbide where silicon carbide grains having an average diameter of not more than 1 μm are present at grain boundaries of silicon nitride and silicon carbide grains having a diameter of not more than about 0.5 micrometers are dispersed within the silicon nitride grains; and dispersed in the matrix phase (2) a dispersion phase including (a) silicon carbide grains having an average diameter of 2 to 50 μm or (b) silicon carbide whiskers having a short axis of 0.05 to 10 μm and an aspect ratio of 5 to 300.

5. A sintered composite material according to claim 4, which comprises 5 to 40% by volume of the dispersion phase.

6. A sintered composite material according to claim 4, wherein the matrix phase contains 3 to 25% by volume of the silicon carbide particles.

7. A process for the production of a sintered silicon nitride-silicon carbide composite material which comprises:
(a) mixing (1) a matrix phase-forming material comprising either (i) an amorphous silicon nitride-silicon carbide hybrid powder or (ii) a powdery mixture of silicon nitride powder and a silicon carbide powder having an average particle diameter of not more than 0.5 μm wherein (i) or (ii) forms a matrix phase in which silicon carbide grains having an average diameter of not more than 1 μm are present at grain boundaries of silicon nitride and silicon carbide grains having a diameter of not more than 0.5 μm are dispersed within the silicon nitride grains, with (2) a dispersion phase-forming material including at least one of (iii) silicon carbide grains having an average diameter of 2 to 50 μm and (iv) silicon carbide whiskers having a short axis of 0.05 to 10 μm and an aspect ratio of 5 to 300, and a sintering additive;
(b) forming a shaped article of the mixture; and (c) sintering the shaped article at a sintering temperature between 1500° C. to 2300° C.

8. A process according to claim 7, wherein the sintering additive forms a liquid phase at a sintering process.

9. A process according to claim 7, wherein the sintering additive is at least one member selected from the group consisting of MgO, $Al_2O_3$, $Y_2O_3$, AlN, $SiO_2$ and oxides of lanthanum series.

* * * * *

UNITED STATES PATENT AND TRADEMARK OFFICE
CERTIFICATE OF CORRECTION

PATENT NO. : 5,134,097

DATED : July 28, 1992

INVENTOR(S) : Niihara et al.

It is certified that error appears in the above-identified patent and that said Letters Patent is hereby corrected as shown below:

On the title page:

Item no.[56] Reference Cited, U.S. Patent Documents, change "4,885,269" to --4,885,265--.

Signed and Sealed this

Fourteenth Day of September, 1993

Attest:

BRUCE LEHMAN

*Attesting Officer*     *Commissioner of Patents and Trademarks*